United States Patent [19]
Eustance

[11] 3,833,978
[45] Sept. 10, 1974

[54] STABILIZED ESTER IMPREGNANT

[75] Inventor: John W. Eustance, South Glens Falls, N.Y.

[73] Assignee: General Electric Company, Hudson Falls, N.Y.

[22] Filed: June 12, 1973

[21] Appl. No.: 369,203

Related U.S. Application Data

[63] Continuation-in-part of Ser. No. 281,204, Aug. 16, 1972, Pat. No. 3,754,173.

[52] U.S. Cl............................. 29/25.42, 317/259
[51] Int. Cl............................................ H01g 13/00
[58] Field of Search.................. 317/259, 258, 260; 29/25.42

[56] References Cited
UNITED STATES PATENTS

| | | | |
|---|---|---|---|
| 3,242,402 | 3/1966 | Stahr et al. | 317/259 |
| 3,363,156 | 1/1968 | Cox | 317/259 |
| 3,424,957 | 1/1969 | Katchman | 317/259 |
| 3,568,015 | 3/1971 | Lobo | 317/259 |

Primary Examiner—Charles W. Lanham
Assistant Examiner—Carl E. Hall

[57] ABSTRACT

A high temperature and extended time method of impregnating electrical capacitors with an epoxy stabilized dielectric liquid aromatic ester.

6 Claims, 6 Drawing Figures

PATENTED SEP 10 1974

3,833,978

STABILIZED ESTER IMPREGNANT

BACKGROUND OF THE INVENTION

This invention is a continuation in part application of applicant's copending application Ser. No. 281,204, Eustance, filed Aug. 16, 1972 and now U.S. Pat. No. 3,154,173 assigned to the same assignee as the present invention.

This invention relates to a stabilized liquid ester impregnant for electrical devices, and more particularly, to an improved stabilized aromatic ester impregnant particularly adapted for electrical capacitor use.

There are a great number of different kinds of dielectric liquid impregnated capacitors which have been developed over the years to meet specific capacitor application requirements. Broadly speaking, among the larger capacitors are found high voltage (above 660 volts AC), and low voltage power capacitors. These capacitors also may be denoted as energy storage capacitors, induction heating capacitors, high frequency capacitors, and power factor correction capacitors. Smaller capacitors are usually found in application categories as motor run capacitors and lighting capacitors.

Furthermore the requirements of different capacitor applications have given rise to the use of alternate or different capacitor impregnants. Accordingly, at the present time, there are a number of commonly used liquid impregnants such as chlorinated diphenyl, mineral oil, castor oil, and silicone oil. However, the most outstanding and widely used of these impregnants is chlorinated diphenyl, which has been the major impregnant used in most capacitor applications in the USA for many years. Significantly, it is essentially the exclusive impregnant employed in all power, motor run, and ballast (fluorescent lighting) capacitors in the USA, and several million pounds yearly are used for these capacitors.

With the advent of more sophisticated capacitor structures and new capacitor dielectrics such as the synthetic resins, including polypropylene, the chlorinated diphenyls are less attractive as the capacitor impregnant. The polychlorinated biphenyls, a term which is inclusive of chlorinated diphenyl as used herein, are broadly referred to as PCB's. The polychlorinated biphenyls have recently been associated with ecological problems and their continued use and escape into the environment is under study and scrutiny. As a consequence these other related factors have spurred the search for a replacement capacitor impregnant.

A replacement impregnant for chlorinated diphenyl should have the same or better general characteristics as chlorinated diphenyl and still provide the outstanding electrical and compatibility performance with the two most important present-day capacitor dielectrics, paper and polypropylene. In this connection, a typical and rigorous application for such an impregnant would in an AC capacitor subjected to high voltage stress conditions such as described in U.S. Pat. No. 3,363,156, Cox, assigned to the same assignee as the present invention.

Ordinarily, there are a large number of liquid dielectrics which would be candidates as capacitor impregnants except for their short life characteristics or because they are not applicable for most capacitor applications generally. In fact, many of the presently used capacitor impregnants also suffer because of their limited applicability. For example, castor oil is usually regarded as fairly limited to capacitors for direct current applications. For these and other reasons, a variety of stabilizers have been developed for use with capacitor impregnants. For example, known stabilizer additives for the most common impregnant, chlorinated diphenyl, such as the epoxide and quinones, were developed or chosen to be scavengers for hydrogen and chlorine atoms released from or generated from the impregnant and other materials in the capacitor during its operation. For non-halogenated impregnants, where chlorine, bromine, etc., were not present or generally releasable in deleterious form, other stabilizer additives were used. These other stabilizer additives were not satisfactorily effective for many kinds of capacitor impregnants because they provided no marked and immediate differences in the operating characteristics of the impregnant in the capacitor environment. One example of such a stabilizer is an oxidation inhibitor which performs its narrow function without much immediate effect on other deleterious factors in the capacitor which may precede the function of the oxygen inhibitor or operate independently thereof to contribute to high power factors.

A number of impregnants from the class of materials known as esters have been disclosed as capacitor impregnants. Esters may be described as aliphatic esters or aromatic esters. The aliphatic esters have found only limited applications as capacitor impregnants. One common aliphatic ester is castor oil which has found only limited application in the narrow area of direct current, DC, capacitors and high frequency capacitors. For the greater application area of alternating current, AC, capacitors and low frequency capacitors, both the aliphatic and aromatic liquid esters have proven to be unstable. In U.S. Pat. Nos. 1,895,376, Clark, and 1,966,162, Clark, both assigned to the same assignee as the present invention, certain aromatic esters such as diethyl phthalate and dibutyl phthalate are disclosed. Also mentioned is the overriding disadvantage of high power factor of the materials at elevated temperatures. Other than the high power factor and hydrolysis problems, the aromatic esters have several most favorable attributes and characteristics as electrical capacitor impregnants. Their development as capacitor impregnants however never materialized because the noted disadvantages were too severe and there were no known practical solutions.

It has now been discovered that members of a class of materials known as the epoxides can be used to effectively stabilize certain aromatic esters for use in capacitors operable at elevated temperatures. Surprisingly these stabilized esters provide a capacitor with resultant very low power factors over a long capacitor life.

Accordingly, it is an object of this invention to provide an improved method for the use of epoxide stabilized aromatic ester impregnant for electrical applications.

It is another object of this invention to provide an improved method for the use of epoxide stabilized phthalate aromatic ester impregnant for electrical capacitors.

It is another object of this invention to provide an improved method for the use of epoxide stabilized phthalate ester impregnant for electrical capacitors subjected to high voltage stress conditions.

It is a further object of this invention to provide an improved method for the use of epoxide stabilized di (2-ethylhexyl) phthalate impregnant for electrical capacitor applications.

It is yet another object of this invention to provide a method of impregnating electrical capacitors with an epoxide stabilized DOP as an electrical capacitor impregnant.

It is a further object of this invention to provide improved method for the use of an epoxide stabilizied DOP impregnant for AC capacitors with low power factors.

SUMMARY OF THE INVENTION

One form of this invention comprises an epoxide stabilized liquid aromatic ester for use as an electrical capacitor impregnant. More specifically, the aromatic ester is a derivative of phthalic acid, and for the purpose of this invention, the preferred ester is the reaction product of phthalic acid and 2-ethylhexyl alcohol, known as di (2-ethylhexyl) phthalate or more commonly dioctyl phthalate (DOP). As hereinafter employed in this specification, the term DOP refers interchangeably to di (2-ethylhexyl) phthalate.

Alternating current capacitor tests have shown that DOP is not a preferred impregnant for high voltage stressed AC capacitors in spite of certain attractive properties such as capacitor compatibility, high dielectric constant, and biodegradability. These good properties are overshadowed by instability under high electrical stress and resultant short life. One indication of short life in a capacitor is a rapidly rising or high dissipation or power factor. Power factor, which is a measure of electrical loss in a capacitor, is a critical item in high voltage stressed alternating current power capacitors generally. Electrical instability leads to an early breakdown or failure which is critical for long life capacitor such as those obtainable with the present chlorinated diphenyl impregnated power capacitors.

Stabilization of an impregnant usually involves the addition of small quantities of a further material to the impregnant which will improve the impregnant by neutralizing impurities found in the capacitor, or generated therein, which cause degradation. Ordinarily, the impregnant to be improved is already a good and effective capacitor impregnant and the stabilizer additive provides a degree of improvement. DOP is a liquid material that, when utilized as an impregnant in capacitors subjected to elevated temperatures and high voltage stresses, shows a rapid rise in power factor and subsequent early capacitor failure. For these reasons primarily, the development of DOP as a practical and commercially acceptable electrical capacitor impregnant has been negated.

However, it has now been discovered that DOP may be effectively stabilized or altered so that it may be used as the sole or principal impregnant in an AC capacitor and under high voltage stress conditions. More particularly, it has been discovered that epoxides, which were formerly considered to be only chlorine (Cl) or hydrogen chloride (HCl) scavengers, interact in a different manner to stabilize DOP in a capacitor embodiment where hydrogen chloride or chlorine are not ordinarily present in the materials or generated therefrom.

BRIEF DESCRIPTION OF THE DRAWINGS

This invention will be better understood when taken in connection with the following description and drawings in which.

DESCRIPTION OF THE PREFFERED EMBODIMENTS

DOP is a material which has been known in the art of chemical plasticizers for synthetic resin materials and is commercially available from several sources, for example, under the name "Flexol" describing a Union Carbide Company product. A description of DOP as a plasticizer is found in The Technology of Solvents and Plasticizers by Arthur K. Doolittle, copyright 1954 by Union Carbide and Carbon Corp., Properties of Individual Plasticizers, pages 962–964. Additionally, U.S. Pat. No. 1,923,938 describes this product in more detail. Typical characteristics of this product are given in the following Table 1.

TABLE 1

Typical Properties of DOP Liquid

| | |
|---|---|
| Di (2-ethylhexyl) phthalate, $C_{24}H_{38}O_4$, Molecular Weight=391 | |
| Density 25°C | 0.987 gm/cm$^3$ |
| Refractive Index N D/20°C | 1.4859 |
| Boiling Point | 229°C/5 mm pressure |
| Pour Point | −55°C |
| Dielectric Constant (DK) | 5.24/25°C |
| % Dissipation Factor | 7.7%, 8.5% at 100°C/100 H$_z$ as received in 55 gal. drums |
| Viscosity | 100°F: 30 cs |
| | 210°F: 4.2 cs |

In the practice of this invention, DOP has been used as the sole impregnant in (a) capacitors wherein only a paper material was used as the dielectric material, (b) capacitors wherein only a synthetic resin was used as the dielectric material, and (c) capacitors utilizing mixed combination of synthetic resin and paper dielectric materials.

Typically, a preferred capacitor embodiment of this invention includes one or more capacitor roll sections which are rather tightly contained in a close fitting can or casing filled with a liquid impregnant and sealed. A capacitor roll section comprises alternate strips of dielectric material and electrode material which may be assembled in various laminate arrangements or structures as noted, for example, in the above Cox U.S. Pat. No. 3,363,156.

Figure 1:
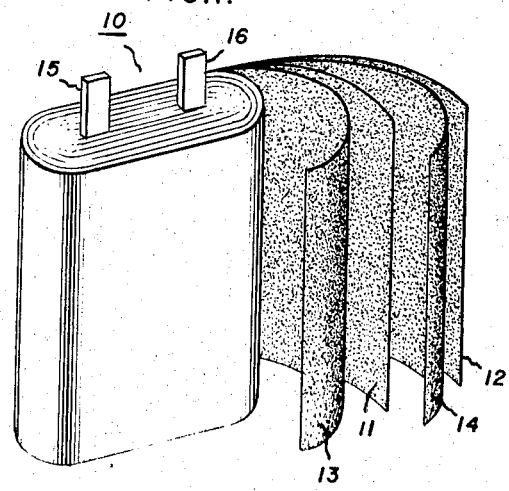
FIG. 1 is an exemplary capacitor roll section utilizing paper as the dielectric.

Referring now to FIG. 1, there is disclosed an exemplary capacitor roll section 10 including a pair of electrode foils 11 and 12 and dielectric paper strips 13 and 14. The electrode foils 11 and 12 may also be formed as metallized coatings on the paper strips 13 and 14 or on separate and additional dielectric strips of various materials including paper and plastics. Suitable electrical connectors or taps 15 and 16 are utilized to connect the electrode foils 11 and 12 to appropriate capacitor terminals 17 and 18. The roll section 10 is placed in the can 17 of FIG. 2 and after suitable drying and evacuation the can is filled with a liquid impregnant and sealed. Connectors 18 and 19 of the can connect to taps 15 and 16 of the roll section 10 for electrical connection purposes.

Figure 3:
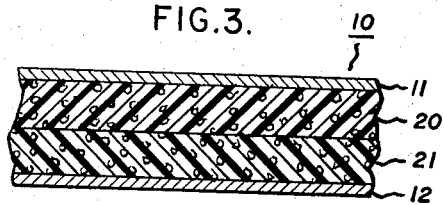
FIG. 3 is a cross-section view of a part of a capacitor roll section utilizing synthetic resin film as the dielectric.
Figure 4:
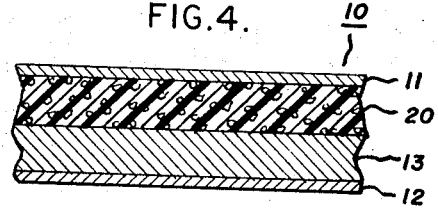
FIG. 4 is a view of a part of a capacitor roll section utilizing mixed synthetic resin film and paper as the dielectric.
Figure 5:
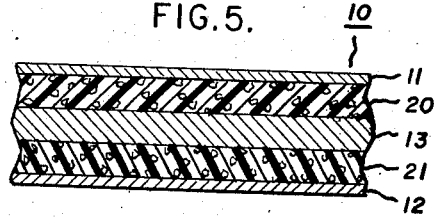
FIG. 5 is a cross-section view of a part of a capacitor roll section utilizing a synthetic resin film in a different dielectric arrangement in a capacitor.

Each dielectric paper strip 13 and 14 may be replaced with multiple paper strips in order to have a thicker dielectric or to take the electrical advantage of the use of multiple strips. Each strip 13 and 14 may also be replaced with one or more synthetic resin strips 20 and 21, as shown in FIG. 3, or with a mixed dielectric of a paper strip 13 and a resin strip 20, as shown in FIGS. 4 and 5. Additional typical constructions and embodiments and their descriptions are found in the aforenoted U.S. Pat. No. 3,363,156, Cox.

In these typical embodiments, the dielectric liquid impregnant is caused to penetrate, permeate and fill essentially all of the gaps, voids and spaces found in and between the dielectric strips 13 and 14. This kind of impregnation termed essentially complete impregnation is necessary to reduce the occurrence of deleterious corona discharge in AC capacitors at their application voltage, and to prevent arcing. The impregnant, by being in the electrical field between the electrodes, is subjected to high electrical stresses, some corona discharge, elevated and fluctuating temperatures, and other deleterious environmental conditions. In power capacitors, for example, these conditions are not expected to cause failure of the capacitor over an active life of from 10-20 years.

Consequently, in the capacitor art, great care is taken to provide high purity and compatible materials such as paper and chlorinated diphenyl, and great effort is utilized to remove gases and water vapor by high temperature drying and evacuation processes. Impurities in a capacitor may be present in the materials and structure by way of gases, water vapor and solid impurities such as chemical elements and compounds found in the other materials, e.g., in the paper or in the polypropylene film. These chemical elements and compounds may be of an extraneous nature or are utilized in the production of the other materials and are introduced therein for that reason. A source of capacitor impurities is the catalyst used in the production of polypropylene. A typical catalyst will provide impurities in the form of salts of aluminum and titanium. Dormant impurities may be released by the impregnant. For example, chlorinated diphenyl impregnant is a solvent which dissolves and transports impurities, and leaches out impurities in the dielectric, which are detrimental to the capacitor. The impurities react unfavorably with the impregnant or otherwise combine to react with the impregnant, resulting in degradation usually first noticed in a capacitor by an increase in power factor.

The elevated temperature conditions in an operative capacitor and the minor electrical discharges and corona which occur, activate the impurities with resultant degradation of the capacitor. Principal elements known to cause early capacitor failure are hydrogen and chlorine which combine to provide, for example, hydrogen chloride HCl. Chlorine therefore was looked upon as an undesirable element to have in a capacitor impregnant or incorporated in other capacitor materials. Unfortunately, it remained, for other reasons, a critical component in significant amounts in the best available AC capacitor impregnants, i.e., polychlorinated diphenyl. Because of these conditions, many additives were proposed for chlorinated diphenyl impregnants to act as HCl, chlorine or hydrogen scavengers and thus to extend the effectiveness and life of the capacitors. Among these additives were tin tetraphenyl, anthraquinone, and epoxides.

Despite the fact that esters were known to have high power factor and rapid degradation characteristics, DOP was utilized to impregnate AC capacitors. Since DOP contains no known chlorine components the cogent reason for the use of the noted additives was lacking. Tests made on DOP impregnated AC capacitors subjected to high voltage stress conditions, such as those described with respect to FIGS. 1 and 2 indicate, initially, fairly good electrical results. However, on accelerated life tests at elevated temperature, increasing and prohibitive numbers of capacitor failures occurred, primarily indicated by rising power factors and subsequent electrical failure. Tests were repeated with the capacitor of FIGS. 3 and 4, which differ from the capacitor of FIG. 1 in that synthetic resin film strips are included in or replace the paper strips 13 and 14 of FIG. 1. Failures similar to those of the paper capacitor occurred. Examination in both instances failed to show the presence of any HCl or chlorine such as would be expected in a chlorinated diphenyl impregnated capacitor.

It was unexpectedly discovered that the addition of an expoxide compound to the DOP effectively stabilized a DOP impregnated capacitor against early failure and short life. A repeat of the above and other appropriate tests with the use of an epoxide showed dramatic reduction of failures as noted in the following examples. In these examples, the DOP was purified by a column filtering process utilizing alumina or fullers earth as the filtering material. In addition, the impregnation process relates generally to that as described in the noted U.S. Pat. No. 3,363,156, Cox, including drying the capacitors by subjecting them to elevated temperatures, which may be above 100°C and usually below about 125°C, for several hours. During this cycle, the capacitors were under vacuum conditions of less than 200 $\mu$ mercury. After impregnation with DOP, which was at about 70°C to 80°C, the capacitors were sealed and then heat soaked at about 100°C for several hours, e.g., 4 to 16 hours. In the heat soak time, the lag for the temperature in the capacitor to reach the desired level and the cooling down to room temperature is not included. The times given are the times at temperature.

EXAMPLE I

Figure 2:
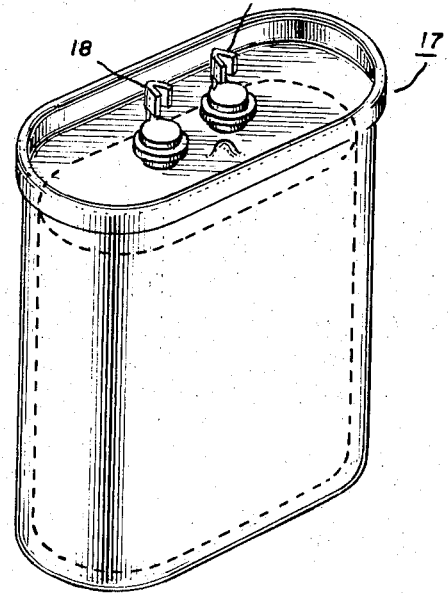
FIG. 2 is a complete capacitor in the form of a sealed can containing the roll section of FIG. 1.

Two sets of capacitors of ten each as described with respect to FIGS. 1 and 2 were assembled. The paper dielectric strips 13 and 14 each comprised a pair of paper strips, one of which was 1 inch wide and 0.30 mil thick and the other was 1 inch wide and 0.35 mil thick. Unsealed capacitors of FIG. 2 were subjected to elevated temperature of 125°C and vacuum conditions for several hours. Thereafter, the Group 1 capacitors were filled with purified DOP and the Group 2 capacitors were filled with the same purified DOP to which was added 1% by weight of an epoxide known as diglycidyl ether of bisphenol A (Dow epoxy resin No. 330, a product of Dow Chemical Co.). Results are indicated in the following table.

LIFE TEST

380 Volts, AC(VAC) and at 100°C

|  | Failed/Hours |
|---|---|
| Group 1 | 6 – 4200 |
| Group 2 (Epoxide) | 0 – 4279 |

550 Volts, AC(VAC) and at 85°C

| Group 1 | 7 – 1130 |
|---|---|
| Group 2 | 2 – 4205 |

It is seen from the foregoing values that failures are significantly reduced and life extended in those capacitors containing the epoxide additive. In the first life test, the capacitors were tested under rigorous conditions of 100°C and 380 volts AC. In spite of these conditions, there were no failures in 4,279 hours of operation while six of the capacitors not containing epoxide had failed in 4,200 hours. Under even more rigorous conditions of the second life test, the improved results are equally surprising.

The marked benefit of epoxide addition to paper dielectric capacitors is noteworthy. Ordinarily, the known generation of water vapor by the paper and the known hydrolysis to ionizable products of DOP ester would seem incompatible. However, a very small amount of epoxide appears to provide a favorable reaction greater than expected considering the stoichiometric ratios of the reactants.

In the following example, capacitors of the FIG. 3 kind, i.e., using a synthetic resin polypropylene film 20 and 21 as the dielectric, were subjected to similar testing.

EXAMPLE II

In this example, two groups of ten each of unsealed capacitors were assembled, as illustrated in FIG. 1, 2 and 3. The dielectric was biaxially oriented isotactic polypropylene strips 1-⅞ inches wide and 0.35 mil thick. The capacitors were subjected to room temperature vacuum drying conditions as well as room temperature impregnation conditions. The Group 1 capacitors contained the same purified DOP but with the addition of 1.0% by weight of diglycidyl ether of bisphenol A. The capacitors were vacuum dried and impregnated at room temperature, thereafter sealed, and subjected to a heat soak at 100°C for 2 hours. Results are as follows:

CAPACITANCE/POWER FACTOR
at 300 VAC and 85°C

|  | 100°C | 85°C | DC Dielectric Strength as Kilovolts per Mil Thickness of Polypropylene |
|---|---|---|---|
| Group 1 | 3.52/.39 | 3.58/.34 | 5.49 |
| Group 2 (Epoxide) | 3.54/.28 | 3.60/.26 | 5.57 |

The same units were subjected to a life test as follows:

LIFE TEST (300 VAC/85°C)

|  | Hours to Failure |
|---|---|
| Group 1 | 3 remaining after 256 hours |
| Group 2 (Epoxide) | 7 remaining after 256 hours |

EXAMPLE III

In this example, an experiment was conducted to compare capacitors of this invention with prior similar capacitors utilizing chlorinated diphenyl as the impregnant to which had been added about 0.3% by weight of epoxide. Three groups of capacitors (ten in each group) were assembled using the construction of FIG. 3. The dielectric was polypropylene film, 1-⅞ inches wide and 0.35 mil thick as in Example II. The capacitors were dried under vacuum at room temperature for several hours and then impregnated at room temperature with the noted impregnant to which had been added 1.0% by weight of diglycidyl ether of bisphenol A. Thereafter, these capacitors were sealed and subjected to a heat soak for a period of 4 hours at 100°C. Life tests and dielectric strength (DS) results measured at 180 volts DC (VDC) per second rate of rise at 85°C within the scope of this example are given as follows:

|  | Initial DS 85°C–KV AVG. | No. Failed/No. Tested/Hours 380 VAC/ 100°C | 550 VAC/ 85°C |
|---|---|---|---|
| Group 1 Purified DOP No Epoxide | 1.92 | 7-10-256 | 6-9-256 |
| Group 2 Purified DOP 1% Epoxide | 1.95 | 6-9-867 (first failure at 394) | 7-9-835 |
| Group 3 Chlorinated Diphenyl + Epoxide | 1.76 | 8-9-256 | 9-9-177 |

These results show that the stabilized DOP of this invention withstands high temperature life tests better than the other capacitors. Note that the first failure of DOP-epoxide capacitor at 380 VAC-100°C did not occur until after 394 hours had passed, whereas without stabilization seven DOP capacitors failed in 256 hours and eight chlorinated diphenyl capacitors failed in 256 hours.

Other capacitor structures were also assembled and treated with DOP containing as much as 10% by weight of diglycidyl ether of bisphenol A. For example, the structure of FIG. 5 was assembled as a small capacitor with the noted DOP impregnant, and impregnated in accordance with the teachings of the Cox patent with good results.

It can be seen from the foregoing examples that the epoxide plays a critical part in the capacitor during its operative life. The epoxide stabilizer is characterized in this particular environment as being capable of interacting with those chemical elements or compounds ordinarily found in, or generated during operation of the electrical capacitor to prevent these compounds from breaking down or otherwise degrading the DOP. These elements and compounds, as noted, are those generated in a capacitor which utilizes DOP as an impregnant and in the absence of any materials which would generate HCl. Most of the known epoxides which are otherwise capacitor compatible appear to provide the desired result in varying degrees. One of the mechanisms by which the epoxide interrelates with an ester is that in a capacitor environment both water and acid are formed or are present and esters may break down to form an acid and an alcohol. The epoxide reacts with an acid to form an alcohol and thus prevents the acid from degrading the ester or the capacitor. The epoxide also reacts favorably to combine with the water in the system. The hydrolisis problem is thus minimized. Other mechanisms include passivating or coating foil scratches and reacting with acids generally. In paper dielectric capacitors the epoxide may react with the cellulose to stabilize the system. The function of the epoxide appears to be significantly different where there is a film dielectric only, i.e., no paper dielectric is present in the capacitor. One reason for this is the presence of certain materials in the film such as stearates and antioxidants which are not present in paper, and the lower water content of the film. For these reasons stabilization in an all film capacitor may be arrived at by different intermediate processes which at present are not too well understood.

While the function of the epoxide is in the final result related to an operating capacitor environment, it plays an important function in being present in the ester, i.e., dissolved therein. In this environment the epoxide reacts with the ester degradation products to minimize the hydrolysis problem. It also combines with impurities in the ester or to which the ester may be exposed prior to its use in a capacitor, i.e., during storage, transfer and handling procedures.

The epoxide compound of this invention may be generally characterized by containing the group

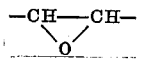

examples of which are glycidyl ethers and derivatives of ethylene oxide. Specific examples of these compounds are phenoxy propylene oxide (phenyl glycidyl ether), glycidyl allyl ether, benzyl ethylene oxide, styrene oxide, 1,3-bis (2,3-epoxy propoxy) benzene, and 4,4′-bis (2,3-epoxy propoxy) diphenyldimethylmethane. In addition, commercially available epoxide compounds which have been found suitable for use in the invention are known as EP107 which is di(2 ethyl hexyl) 4,5 epoxy tetrahydrophthalate, EP201 which is 3,4-epoxy-6 methylcyclohexylmethyl-3,4-epoxy-6-methyl cyclohexanecarboxylate and EP206 which is 1 epoxyethyl-3,4-epoxycylohexane. Mixtures of any two or more of such epoxide compounds may be employed if desired. U.S. patents showing one or more of these epoxides are 3,362,908, 3,242,401, 3,242,402, 3,170,986, all of which are assigned to the same assignee as the present invention.

Tests indicate that the particular kind of epoxide is not critical. Various epoxides or mixtures of epoxides may be used so long as effective amounts are added. An effective amount is primarily related to molecular weight, reaction rate, and solubility in the impregnant. Those epoxides of higher molecular weight are preferred in greater amounts than those epoxides of lower molecular weight. In general, amounts between about 0.01% by weight up to about 10% by weight are satisfactory. The epoxides perform a function which is believed to be common to all the epoxides by reason of their chemical structure. Their reaction time and effect are favorable to DOP in the capacitor environment. In the above examples, major importance was given to the comparative results of use with, and use without, epoxides.

The epoxide of this invention may be introduced into a capacitor by several means. It may be added to the polypropylene dielectric material during its manufacture to be incorporated in the material, or it may be added to the liquid DOP before or after introduction in the capacitor casing. It is preferred that the epoxide be combined with the DOP as a solution, and the solution used to impregnate the capacitor. A primary reason for this preference is that the esters including DOP are sensitive to elevated temperatures and may undergo serious alteration or changes with increasing temperatures. Accordingly, adding the epoxide to the ester prior to such heating, particularly during the inpregnation process, serves to stabilize the ester, quite apart from stabilization in the capacitor environment. The epoxide may also be added by means of certain epoxidized materials such as an epoxidized linseed oil or the epoxidized ester may serve as the principal impregnant.

DOP has been found to be compatible with polypropylene film dielectrics alone, or with paper. The kind of impregnation which is preferred is that described in U.S. Pat. No. 3,363,156, Cox, and referred to as "essentially complete impregnation." In one form, essentially complete impregnation involves subjecting the inpregnated capacitor to elevated temperature, preferably above about 85°C over a long period of time (heat soaking) to cause the DOP not only to enter the molecular structure of the polypropylene but also to cause the polypropylene to become somewhat like a semipermeable membrane with respect to DOP and permit DOP to pass through the film. DOP has been found to penetrate polypropylene film more slowly than chlorinated diphenyl. Best results are noted when a more intense evacuation or drying cycle is employed. A 24 hour drying cycle with temperatures of from 130°C to 140°C has been effectively employed with the introduction of DOP into the capacitor taking place at about 100°C.

Heat soaking may be continued as a specific cycle after impregnation and sealing of the capacitor and is also an important criterion. Heat soaking may take place at temperatures above about 85°C and preferably in the range of 100°C to about 120°C. Best results are obtained in the larger and more difficult to impregnate capacitors when multiple heat soaks after impregnation are utilized. For example, a first heat soak is carried out by placing capacitors in an oven and raising the temperature to about 110°C. After 8 hours at this temperature, the temperature is reduced and the capacitors permitted to cool to about room temperature. Thereafter the temperature of the oven is increased to 110°C and maintained for a further period of 8 hours. Comparative tests indicate that the multiple heat soak described provides better results than a single heat soak for 16 hours. A preferred process for the manufacture of DOP impregnated capacitors where paper is involved includes a higher temperature vacuum bake out or drying cycle at 120°–140°C, an impregnation cycle of above about 100°C and multiple heat soaks as described. Where only film is used as the dielectric the bake out cycle may be reduced in both time and temperature.

The polypropylene film as described in the U.S. Pat. No. 3,363,156, Cox, i.e., a stereo regular crystalline, biaxially oriented film, is also preferred and was used in all Examples herein. By crystalline, it is meant that the material has a significant crystalline content and the crystallinity dominates the physical characteristics of the material. DOP is not limited to the dielectrics noted and other members of the polyolefin group as well as other synthetic resins as the polycarbonates, polysulfones, and polyesters are usable dielectrics. The important factor is the use of DOP together with an epoxide stabilizer.

The stabilized impregnant of this invention, particularly DOP, is an improved impregnant for those capacitors subjected to high voltage stress, high temperature conditions. Notably, a high voltage stress condition on the dielectric, when the dielectric is a synthetic resin film such as polypropylene, is from about 750 volts per mil thickness of the polypropylene to in excess of 1,200 volts per mil with the more critical part of the high stress range commencing at about 900 volts per mil and extending to about 1,400 volts per mil. Concurrently, capacitors with these stresses are subjected to a kind of impregnation, denoted as essentially complete impregnation in U.S. Pat. No. 3,363,156, which renders a certainty to the results, e.g., which provides, consistently, a high corona start voltage correlated to the thickness of the dielectric. In power capacitors of the high voltage kind for shunt application where the total dielectric thickness between electrodes may be on the order of 1.0 mil, the corona start voltage must be above 2,000 volts generally (at room temperature), and in many instances will exceed about 2,500 volts. In low voltage applications where thinner dielectrics are used, the corona start voltage may be lower. The corona start voltage is usually from 1-½ to 2-½ times the highest voltage stress in the dielectric at the capacitor application voltage at room temperature, and is stable under variable operating conditions of the capacitor.

DOP is useful for many different kinds of dielectric systems of the single dielectric material kind, such as all paper, all film, or mixtures thereof. An example of a mixed dielectric system is shown in the FIG. 4 arrangement wherein a sheet of paper 13 is adjacent one electrode 11. It can be seen that other mixed dielectrics as in FIG. 5 can include two sheets of film 20 and 21 with an intermediate sheet of paper 13, or conversely two sheets of paper and an intermediate sheet of film.

Figure 6:
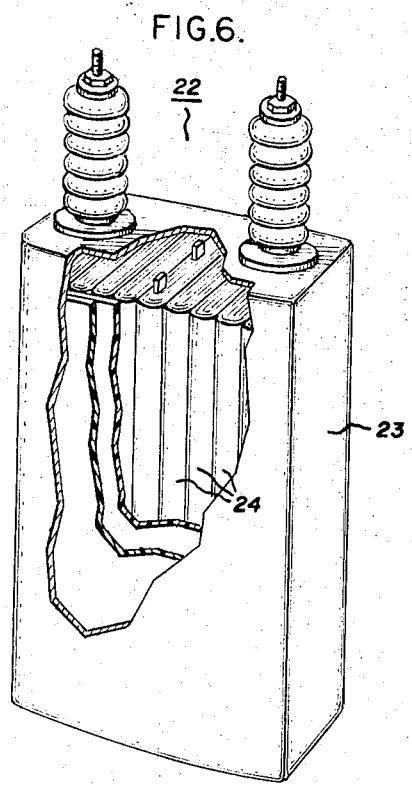
FIG. 6 is greatly reduced drawing of an example of a power capacitor utilizing multiple rolls and common to the large size power factor correction, induction heating and high frequency capacitor applications.

FIG. 6 represents a high voltage power factor correction kind of capacitor wherein a low power factor is essential to its acceptability. In FIG. 6, capacitor 22 comprises a large can or casing 23, for example of 0.8 cu. ft. volume, in which a large number (10 to 40) of elongated roll sections 10 are used. These roll sections 10 may be from 10 to 25 inches in length. To be effective, the DOP impregnant and additive must be permeated throughout each roll section 10 because failure in but one section 10 will cause failure of the entire capacitor. Therefore, these power capacitors 22 undergo extensive drying conditions, for example, by being subjected to low pressures of less than 200 $\mu$ and elevated temperatures of 100°C to 150°C for 15 to 30 hours. They are filled with the impregnant while they are still under vacuum and at some elevated temperature. It is usual for the impregnant also to be at 70°–80°C during filling of the casings. At this point, the capacitor is usually sealed and is again subjected to elevated temperatures of about 80° to 120°C for long periods of time, depending on the size of the capacitor and the king of dielectric material used. All-paper dielectric requires a minimum period of time and may not require any subsequent heating. An all-film capacitor may require a heat soak for as much as 16 to 24 hours.

EXAMPLE IV

Tests were made on other aromatic ester impregnants containing epoxide additives. In one such test performed with typical capacitors as in the above examples, the dielectric was polypropylene and impregnant used was dicapryl phthalate. The epoxide was 1.0% by weight EP206. These capacitors were tested at 550 VAC at 85°C under an extremely high film stress of 1,570 volts per mil thickness of the polypropylene. Surprisingly, these capacitors, after 9,500 hours of life, are performing equally as well as control capacitors using chlorinated diphenyl as the impregnant.

EXAMPLE V

Capacitors were made up using the configuration of FIG. 2 and 5. The dielectric was one strip of 0.5 mil paper, 3.625 inches in width, and two strips of 0.7 mil polyprolene 3.625 inches in width. Capacity was about 0.5 uf. The capacitors were dried under vacuum at 130°–140°C temperature for 24 hours and then impregnated at 100°C temperature. There were two groups of capacitors. In one group the impregnant was DOP plus 1.0% by weight of epoxide and in the other group the impregnant included 80% by weight of DOP and 20% by weight of dodecylbenzene. To this mixture there was added 1.0% by weight of EP206 epoxide. Thereafter these capacitors were sealed and subjected to a heat soak of about 100°C for about 8 hours. The capacitors were given a corona start voltage test and subjected to a further heat soak for an additional 8 hours. The capacitors were again subjected to a corona start voltage test. This latter test showed a marked increase in the corona start voltage. The latter test showed that the corona start voltage was markedly increased by the second heat soak which was necessary to bring the capacitor up to a satisfactory corona level and was higher for the DOP dodecyl-benzene impregnant than for the DOP impregnant alone.

Not all dielectric liquids are satisfactory as capacitor impregnants. A dielectric liquid should have the general properties of being in purified or purifiable form and having a boiling and freezing point outside of the operating temperature range of the capacitor and a flash point above about 175°C. Furthermore, the liquid should have a vapor pressure below atmospheric pressure for temperatures up to about 200°C and preferably up to about 300°C and a dielectric constant above 2, particularly for synthetic resin film dielectrics such as polypropylene, and preferably from 4 and above for paper dielectrics. In addition the liquid should have a relatively low viscosity, less than about 1,000 centistokes at 25°C, and remain liquid to about −40°C.

Power factor or dissipation factor is an extremely important criteria for a capacitor, particularly an AC power factor correction capacitor, because it is ordinarily operable at elevated temperatures and is usually subjected to elevated temperatures in its manufacturing process. Power factor tends to increase rapidly with temperature. Power factor of the purified impregnant itself should be significantly lower than 10% and preferably less than 5.0% measured at 100°C at 100 Hertz so that in the final capacitor the resulting power factor can be reduced to less than about 1%. The low power factor must be retained over a long life period extending for many years.

Furthermore the impregnant should be compatible with other materials in the capacitor structure and be capable of withstanding fluctuating capacitor operating temperatures at high voltage stress conditions. Ease of handling, impregnation and other physical characteristics are desirable. In addition it is most desirable that the impregnant have a high level of biodegradability compared to chlorinated biphenyls and a low level of toxicity.

The aromatic esters most suitable for the purposes of this invention meet the criteria as above described and are preferred in this invention. Preferred esters, otherwise meeting appropriate dielectric tests, are the reaction product of an aromatic acid and an alcohol. A typical formula would be

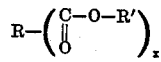

where R is an aromatic substituent such as pyromellityl, terephthallyl, phthallyl, trimellityl, trimesyl, phenyl, napthyl, biphenyl, tolyl, etc. and where R' can be an alkyl or aryl group such as methyl, ethyl, propyl, butyl, pentyl, hexyl, heptyl, octyl, nonyl, and decyl, etc. These are straight chain alkyl groups. However, branch chain alkyl groups are also included. By way of example these may include 2-ethyl hexyl, isopropyl, isobutyl, isooctyl, etc. Examples of phthallic acid aromatic esters which may also be useful in the practice of this invention include the dimethyl, diethyl, dipropyl, etc., series. An example of a benzoic acid ester is butyl benzoate.

In addition to organic acids the esters of this invention include the reaction products of other acids particularly phosphoric acid with the above mentioned alcohols. Specific examples include tricresyl phosphate and triphenyl phosphate. They are also susceptible to degradation by hydrolysis or oxidation and benefit from the presence of epoxides. The aromatic esters of this invention are unique in that the reaction characteristics are predictably similar, particularly for the phthalate esters, so that where there is another component, if any, is otherwise a good capacitor impregnant the combination of the aromatic ester and epoxide is useful.

The ester of this invention may comprise mixtures of esters or mixtures of esters and other, otherwise satisfactory impregnants. It is most preferred that the final impregnants include the ester of this invention as its principal or dominant component. For the purpose of this invention, a mixture may comprise mixtures of the esters of this invention with examples being DOP and dibutyl phthalate, and DOP and didodecylphthalate. The mixture may also comprise an ester of this invention with an aliphatic ester such as dibutyl sebacate or castor oil. The mixture may further comprise the ester of this invention with a hydrocarbon generally, such as, mineral oil, the alkyl-naphthaleness, polybuteness, and the like. Specific examples of these mixtures are DOP and mineral oil and DOP and dodecylbenzene. Mixtures may also include other esters such as the phosphates for example tricresyl-phosphate and triphenyl phosphate. Mixtures are utilized to provide a final impregnant with a characteristic different from the ester of this invention, such as an increased dielectric constant. The added material may also be used in the form of a diluent or as an impregnant aid, i.e., a wetting agent. One example of a material which performs multiple functions is dodecylbenzene which acts as a wetting agent and an impregnant and therefore can be used in relatively large quantities. While it is preferable that the ester of this invention predominates the mixture insofar as the electrical characteristics are concerned, it is within the concept of this invention that smaller amounts of the ester of this invention can be employed. For example, from about 10% to about 40% by weight of the ester of this invention can be added to other impregnants to alter their characteristics. In the context of mixtures in the present invention, the mixture may comprise large quantities of a suitable epoxide where the epoxide serves both functions, i.e., of being a stabilizer and an impregnant.

This invention as practiced, specifically with aromatic exters as described, has shown the most dramatically improved results. An epoxide stabilized aromatic ester, such as DOP, provides an impregnant unexpectedly equal to and better in some instances than the best impregnant in use at the present time, chlorinated diphenyl.

While this invention has been disclosed with respect to particular embodiments thereof, numerous modifications may be made by those skilled in the art without departing from its true spirit and scope. Therefore, it is intended that the appended claims cover all such modifications and variations which come within the true spirit and scope of the present invention.

What is claimed as new and desired to be secured by Letters Patent of the United States is:

1. A method of impregnating an electrical capacitor with an aromatic ester impregnant wherein said capacitor utilizes a synthetic resin film in its dielectric system, comprising
   a. assembling said capacitor in a casing;
   b. subjecting said capacitor to a bake out process at a temperature in the range of from about 100°C to about 140°C while under evacuated conditions, for at least about 8 hours;
   c. filling said casing while under evacuation and elevated temperature conditions with said ester impregnant having dissolved therein an epoxide compound of greater than about 0.01% by weight;
   d. heat soaking said capacitor for at least about 4 hours at a temperature between about 100°C and 140°C for essentially complete impregnation.

2. The invention as recited in claim 1 wherein said capacitor utilizes paper in its dielectric system and said bake out process is continued for at least about 24 hours.

3. The invention as recited in claim 1 wherein after said heat soak said capacitor is cooled and thereafter the said heat soak is repeated.

4. The invention as recited in claim 1 wherein a. said aromatic ester is purified by a column refining process and remove essentially all foreign materials and at least 1.0% by weight of an epoxide is added to said aromatic ester to dissolve therein.

5. A method of impregnating an electrical capacitor utilizing a dielectric consisting essentially of a synthetic resin film comprising a. assembling said capacitor in a casing, b. subjecting said capacitor to an evacuation process while at a temperature in a range of substantially below 100°C to about room temperature, c. filling said casing while under evacuation in said temperature range with an ester impregnant having dissolved therein an epoxide compound of greater than about 0.01% by weight, d. thereafter heat soaking said capacitor for at least about 4 hours at a temperature between about 100°C and 140°C for essentially complete impregnation of the synthetic resin film.

6. The invention as recited in claim 5 wherein said evacuation and filling processes are carried out substantially at room temperature.

* * * * *